May 22, 1934.                R. H. HOUGH                1,959,787
                    MOTIVE AND CLOCK MECHANISM
                      Filed Sept. 11, 1929         4 Sheets-Sheet 1
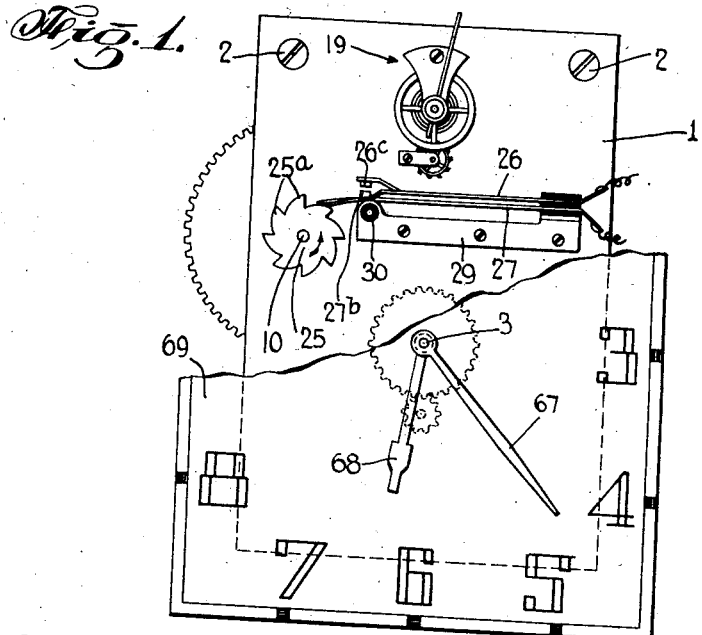
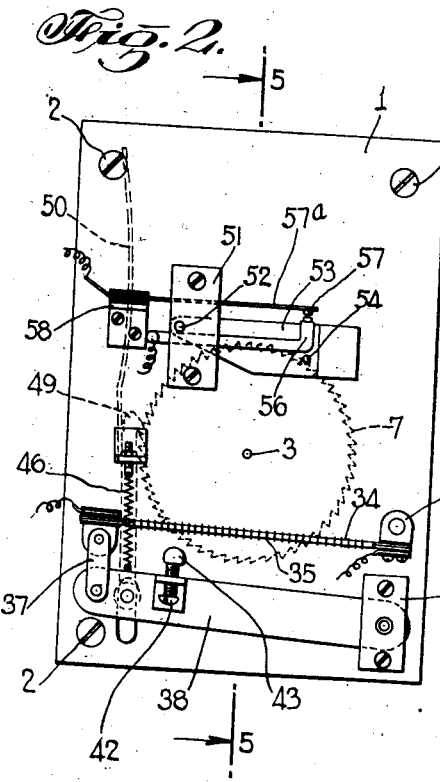
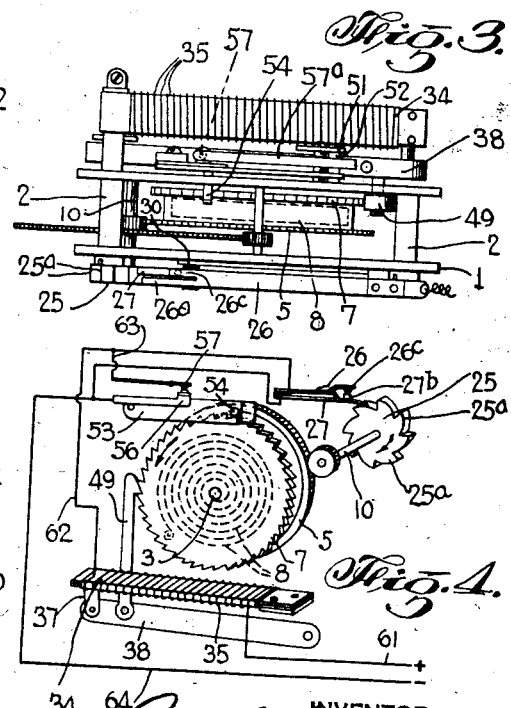

May 22, 1934. R. H. HOUGH 1,959,787
MOTIVE AND CLOCK MECHANISM
Filed Sept. 11, 1929 4 Sheets-Sheet 2
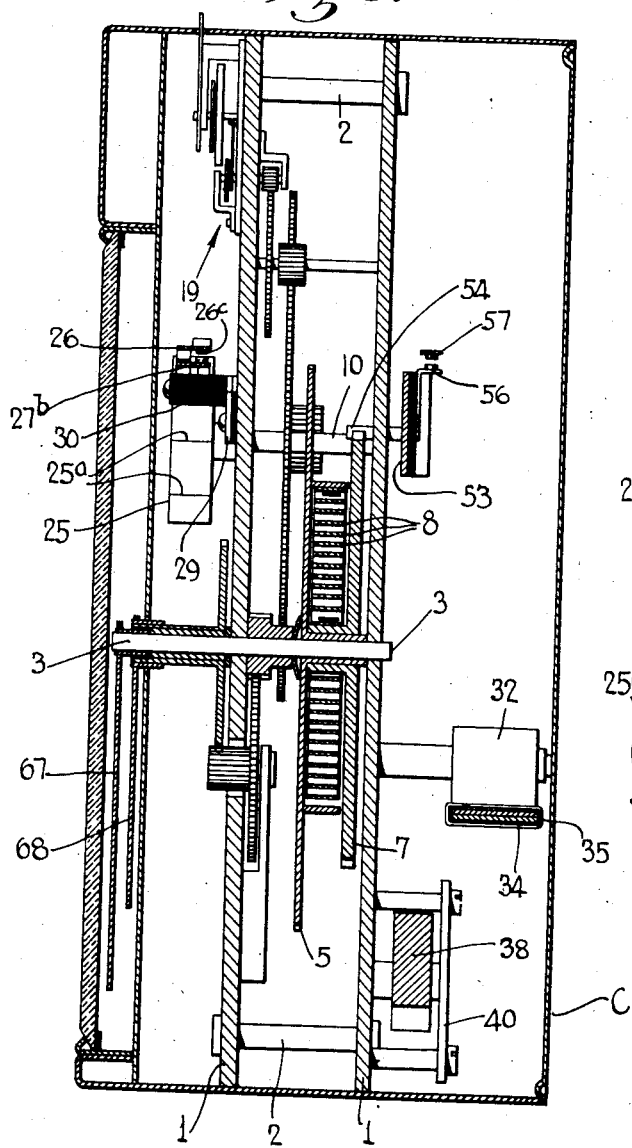
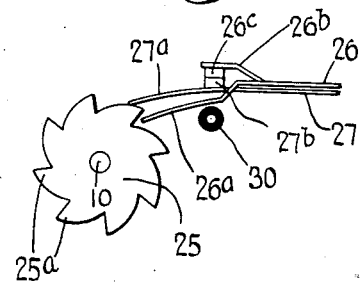
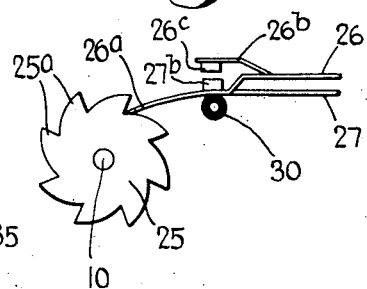
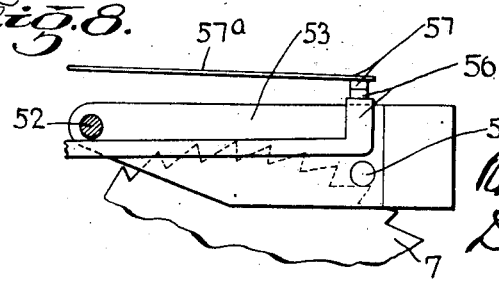

May 22, 1934.

R. H. HOUGH 1,959,787

MOTIVE AND CLOCK MECHANISM

Filed Sept. 11, 1929

INVENTOR
Robert H. Hough
BY
Dempster M. Smith
ATTORNEY

May 22, 1934.　　　　　R. H. HOUGH　　　　　1,959,787
MOTIVE AND CLOCK MECHANISM
Filed Sept. 11, 1929　　　4 Sheets-Sheet 4

INVENTOR.
Robert H. Hough
BY
Dempster M. Smith
ATTORNEY

Patented May 22, 1934

1,959,787

UNITED STATES PATENT OFFICE 1,959,787

MOTIVE AND CLOCK MECHANISM

Robert H. Hough, New York, N. Y., assignor to Instrument Engineers, Inc., New York, N. Y., a corporation of New York Application September 11, 1929, Serial No. 391,711

20 Claims. (Cl. 58—41)

My invention relates broadly to motive mechanisms capable of various applications, and more particularly to clocks or analogous machines including the motive mechanism.

In the broader aspect, the principal feature of the invention structure is a primary motor device, a secondary motor device capable of storing energy, means by which the primary device acts on the secondary device to store or restore energy therein, and controlling means for intermittently actuating the primary device. The driven member of the secondary motor is arranged to do useful work, and the actuation of the primary motor is controlled, directly or indirectly, by the driven member, so that the secondary device is energized or re-energized in proportion to its energy-loss in the performance of work.

The primary motor may be any suitable type of thermo-dynamic motor, and for the purposes contemplated and especially for convenience of control and actuation by commonly available electrical energy, the primary motor is preferably an electro-thermo-dynamic motor designed to convert electric energy into heat and heat into mechanical energy and movement. As herein specifically shown, the primary motor consists of properly connected strips of dissimilar metals with a heating coil wound thereon, and having the characteristic of bending when heated by current flow through the coil. This specific form therefore represents in a broader sense, a thermo-dynamic motor, electrically energized; in a yet broader sense a thermo-dynamic motor irrespective of its mode of energization; and in a still broader sense any suitable motor for the purposes in view and capable of control by the present method.

The secondary motor device, as above stated, has a characteristic of storing, converting and transmitting energy to a driven member, and also drives a controlling member; the secondary motor is here specifically represented by a spring motor of the clock type, but it may be almost any other instrumentality capable of actuation by the primary motor, actuation of the driven member, and control of motor actuation as a function of movement of such driven member, in accordance with the present method of operation.

For convenience of explanation, and especially for identification in the broader claims, the following broad definitions are adopted: The primary power device or motor is called simply a "motor"; the secondary motor or energy-storing device is called a "converter" or "energy-storer", and the complete mechanism is called "motive mechanism" in distinction from the motor and converter, each of which has motor characteristics.

In a more limited aspect, as exemplified by the present adaptation or embodiment of the motive mechanism in clock mechanism, the principal feature is the control of the motor (thermo-dynamic motor, or more specifically, electrically heated thermo-strip) by means which is itself controlled by the clock-escapement, thus introducing a time element, and securing the energizing of the converter (or specifically the spring as here shown) at predetermined intervals and in proportion to the amount of unwinding. The clock will therefore run indefinitely and accurately so long as there is current in the circuit, and if the line supply is interrupted, will still continue to run for a time depending on the "reserve" spring capacity. The spring may in such case be rewound "by hand" (or otherwise) to restore its normal tension.

The control of the motor in a relatively broad aspect of this item, is principally a function of a driven member of the converter; or, as otherwise stated, movement of such driven member is utilized to initiate at suitable intervals the motor action. In some cases, duration of motor actuation may be controlled as a part of the same function or by the same means; that is, the device which initiates such action may also control the duration of the action, thus making motor control entirely a time function; otherwise, the action of the motor may be utilized to determine the moment of cessation of motor action, thus making the duration of motor operation a function of the motor action itself. Referring to electrical energization of the motor, the motor action is of course in such cases most conveniently controlled by a movable contact in the motor circuit. In such cases, a single controlling element or contact may itself be controlled simply by a driven member of the converter or by properly correlated or combined actions of such a driven member and of a motor element; or, in a more limited aspect, the control of the motor may be "duplex"; that is, through at least two circuit-contacts, which may be in either series or parallel relation. One contact is controlled directly or indirectly by a driven member of the converter and initiates the actuation of the motor; the other contact is controlled by the motor or an element which drives the converter, and determines the duration of motor actuation.

The characteristics and advantages of the invention are further sufficiently explained in connection with the following detail description of the accompanying drawings, which show certain exemplifying embodiments. After considering these examples, skilled persons will understand that many variations may be made without departing from the principles disclosed, and I contemplate the employment of any structures that are properly within the scope of the appended claims.

Fig. 1 is a front elevation, with parts broken away, of a clock embodying the invention in one form, and also exemplifying the application of the motive mechanism to one specific use.

Fig. 2 is a rear elevation.

Fig. 3 is a top plan.

Fig. 4 is a perspective diagram explaining the principal features of construction and operation.

Fig. 5 is a section at 5—5 of Fig. 2, enlarged.

Figs. 6 and 7 are fragmentary views of a time-controlled contact device, in different positions.

Fig. 8 is a side elevation, enlarged, of another contact device.

Fig. 9 is a perspective, diagrammatic view of a modification.

Figs. 10 and 11 are similar views of other modifications.

Figure 11:
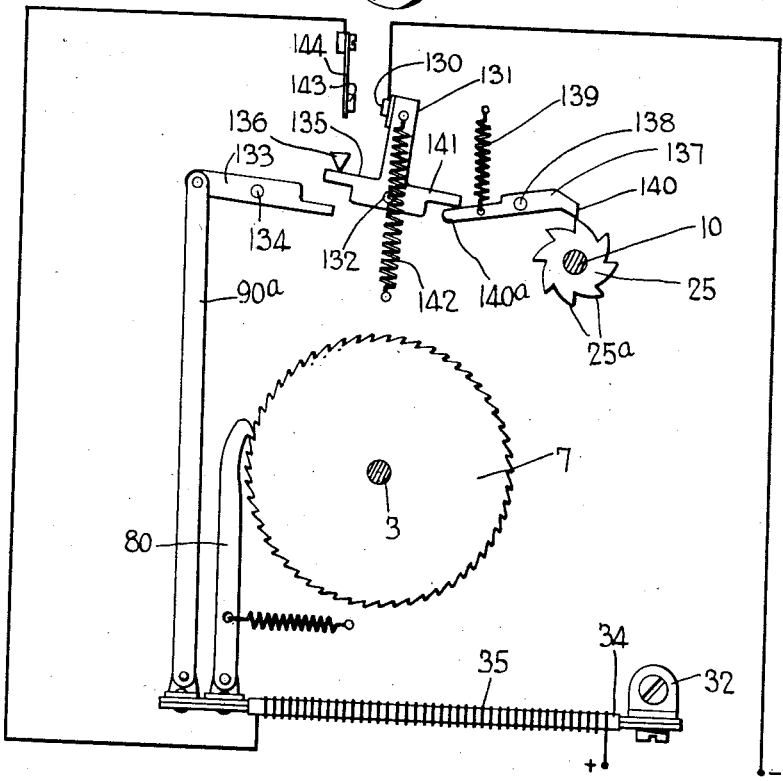

Referring first to Figs. 1 to 8, which show the motive mechanism embodied in a clock; frame plates 1 are located and secured in any suitable case C, the plates being connected by spacers 2 as usual. The clock mechanism proper may be of any known or suitable type, employing weights, or as here shown, a spring 8, which with necessary associated parts, constitutes one specific example of a secondary motor or converter as defined above. One end of the spring is connected as usual to a main driving gear 5, and the other end, to a winding ratchet wheel 7, this being mounted on a main shaft 3. I show a conventional escapement 19 and conventional gearing between gear 5 and the escapement and the hands 67 and 68. A part of the gear train is used for timed control of the primary motor. Almost any part moving in definite relation to a driven member of the energizer, as for example in this case, gear 5, may be employed for this purpose. For certain reasons sufficiently referred to hereafter, I here utilize the eight-minute shaft 10 as the primary time-control element and for this purpose provide a cam 25 having eight lobes 25a mounted on an extended part of the shaft, and controlling contacts 26c, 27b.

The primary motor in the form here shown is a thermo-dynamic device, representing most broadly any suitable motor, and in a somewhat more restricted sense any suitable electrically energized thermo-dynamic motor. Specifically, it consists of properly connected strips 34 of dissimilar metals, having different co-efficients of expansion, the combined strips being rigidly mounted at one end on a bracket 32. The thermo-strip 34 has suitable insulation, and a heating coil 35 is wound about the insulation. When the coil is heated by current flow, the strip in a relatively short time, depending upon its design-characteristics, assumes a bowed form, and when of suitable dimensions its movement is sufficiently powerful for the purposes in view, including clock actuation or specifically, spring-winding. The free end of the thermo-strip is connected by a link 37 to one end of a lever 38 which is fulcrumed in a bracket 40. A pawl arm 49 is pivotally connected to the lever and its pawl-shaped end engages the winding ratchet 7. A spring 50 connected to the pawl arm may bear against one of the spacers 2 to urge the pawl to active position. A combined winding detent and contact device is provided, comprising an arm 53 pivoted at 52 in a frame bracket 51 and having a detent pawl 54 engaging the winding ratchet. This arm also carries a contact 56 properly insulated, cooperating with another contact 57 mounted on a spring or blade 57a which is secured with suitable insulation on a frame bracket 58. The arm may be spring actuated or weighted at its free end.

Another contact mechanism shown in detail in Figs. 6 and 7 is actuated by the cam wheel 25 above mentioned. This mechanism includes springs or blades 26 and 27 suitably insulated and mounted on a frame bracket 29. Blade 26 has an upwardly bent portion 26b carrying contact 26c, and blade 27 carries a cooperative contact 27b. Both blades normally rest on a stop 30 and in that position the contacts are separated. Each blade has an extension, 26a and 27a respectively, resting on the periphery of the cam wheel 25. One of these extensions is slightly longer than the other, the difference in length controlling the duration of contact, as will appear.

The two controlling contacts may be in either series or parallel relation. A parallel arrangement is shown in Fig. 4, which also shows the circuit, and the operation of the mechanism can be followed in this figure. In this diagram direct current supply is indicated for convenience of explanation, although of course, the mechanism will operate equally as well on either direct or alternating current. From positive line a lead 61 goes to one terminal of heating coil 35; from the other terminal of the coil a lead 62 goes to contact 26c and a branch 63 of this lead also goes to contact 57; from negative line a lead 64 goes to the other contacts 27b and 56.

Since the invention provides for rewinding the spring 8 at intervals of practically any desired frequency and to an extent proportional to its unwinding, it is generally practicable to use a spring of relatively small length although of course there is no limitation as to the size or "time-capacity" of the spring.

Assuming that the spring is initially wound up sufficiently to run the clock, and that the leads 61 and 64 are connected to a suitable current supply, and with the parts in an initial position represented in Fig. 4, as the spring runs down the ratchet wheel 7 revolves and the slant face of a ratchet tooth raises pawl 54 tending to bring contacts 56 and 57 together. The eight-minute shaft 10 with its cam wheel 25 revolves seven and one-half times as fast as the ratchet wheel. As one of the lobes or cams simultaneously raises the end extensions 26a and 27a of the contact springs 26 and 27, both of the springs are raised from stop 30, but the contacts are maintained in open position. This condition continues until the shorter extension 26a drops off of the apex of the cam lobe (Fig. 6) while the other extension still rests on the high part of the cam, thereby bringing the contacts together; and they remain in contact until the longer extension drops off the cam, whereupon the contacts are separated and their circuit is broken, (Fig. 7). In the present arrangement, the thermo motor is operated once a minute. Starting with the position of Fig. 7, after the lapse of nearly one minute, the circuit through contacts 27b, 26c is closed by the cam and contact spring action just described, thus energizing the motor (heating the thermo-strip), the circuit being from positive line through the heating coil, conductor 62 to contact 26c, to contact 27b, to conductor 64, and so to negative line. The thermostrip bends, pulling down pawl 49 and revolving the ratchet wheel 7. As the wheel revolves one of its teeth lifts pawl 54, and contacts 56 and 57 are brought together at any convenient time after the other contacts are closed—usually soon after. In this parallel arrangement therefore, it is only necessary that contacts 27b and 26c remain together long enough to close the circuit through the other two contacts, whereupon the energizing of the motor continues, the circuit being from positive line through the heating coil, to conductor 62, to conductor 63, to contact 57 to contact 56, to conductor 64 and the negative line. The circuit through contacts 26c and 27b is now opened by blade extension 27a dropping off of the cam lobe. The thermostrip continues to heat and bend until pawl 54 drops off of the ratchet tooth on which it has been resting, and thereupon the circuit through the heating coil is broken, the strip cools and returns to straight form, raising pawl 49 which engages with the next tooth of the ratchet wheel. Meantime pawl 54 has dropped in front of the radial face of the tooth which it last engaged, and prevents return movement of the ratchet. The operations continue indefinitely as long as the line is energized. The spring is therefore automatically rewound each minute to the same extent that it unwinds in the minute and is therefore constantly maintained at the desired tension, determined by the initial winding. Evidently if current goes off the line the clock will continue to run normally and may be rewound by hand whenever necessary or desired so that there is no risk of the clock getting out of synchronism or off time by temporary failure of current, as is the case in synchronized control by alternating current, and other systems. The maintenance of practically constant spring tension by rewinding at frequent intervals obviously tends to increase the accuracy of the time piece.

Evidently winding control may be obtained from almost any moving part of the clock train, such as the second hand shaft, by the use of one cam; or the winding interval may be varied by gear connections in obvious ways. The control from the eight-minute shaft is selected largely because this shaft moves fairly fast and gives desired accurate control of the contacts 27b, 26c, but without imposing as much frictional drag as would be the case if the contact springs rested on a cam moving at the rate of the second hand.

It will be understood from the preceding description that contacts 27b and 26c in the described parallel arrangement initiate the winding action and it is only necessary for them to be in closed position long enough for the other contacts 56 and 57 to close, whereupon the winding action continues under control of the last-named contacts, which also determine the end of the winding action. It will also be understood that great accuracy in length of stroke of the thermostrip is not essential. It is only necessary that it shall have movement equal to one tooth space of the ratchet wheel with slight overstroke, and overstroke less than that corresponding to another full tooth space will be compensated for by the ratchet wheel moving back into engagement with detent pawl 54 as the thermostrip begins to cool. Also, the stroke may be controlled by stops, as will appear. In Fig. 2, I show a stop 43 co-operating with an adjustment screw 42 on arm 38 to limit the upstroke of the thermostrip and pawl 49. A spring such as 46 may also be provided to insure the return movement of these parts.

It is easily practicable on a commercial production basis to make the thermostrip within the required limits of accuracy, since it is only necessary that the strip shall heat, bend, cool and straighten in some time slightly less than one minute when arranged for a one-minute control interval.

The mechanism may also be so arranged that winding is performed during the return movement (cooling and straightening) of the thermostrip instead of during the active or heating movement. This is preferred in some cases since the cooling time is usually much longer than the heating time. Therefore, in primary clocks where the hands may be driven more directly (that is without a spring or weights and without an escapement-action), or in secondary clocks wherein the hands may be driven directly by the motor as will appear, the clock hands will be moved more slowly during a longer period than if moved during the heating part of the cycle.

A simple means of causing the motor to act during the cooling period (or return stroke) instead of during heating period (active stroke) consists in merely inverting the thermostrip, which bends one way during heating and the opposite way during cooling.

Fig. 9 shows a modification which is suitable for some purposes. In this form there is only one set of contacts 27b, 26c controlled in the same way as in previous example, these contacts being in series with the heating coil. The winding mechanism is the same except that pawl 86 acts only as a detent and has no circuit controlling function. The thermo-strip 34 has an extension 82 moving between fixed stops 83 and 84; that is, normally fixed, although they may of course be made adjustable. In this case, the heating and winding function is controlled entirely by cam 25 and contacts 26c, 27b and it is only necessary that one of the contact blade extensions be made sufficiently longer than the other so that the circuit will remain closed long enough to heat the coil and insure a stroke equal to one tooth space of the ratchet wheel, the stroke being limited in this case by the stops; and that after the circuit is broken, the thermostat shall cool quickly enough to be ready for another action within the determined time interval.

Fig. 10 shows another modification employing two sets of contacts in series. Thus contacts 99 and 100 are in series with the other contacts 26c and 27b and with the heating coil, as the diagram makes obvious without further explanation. Contacts 99 and 100 are normally in closed position while the other contacts are normally open, as previously. Contact 99 is carried on a lever 93 fulcrumed at 94 and having a spring 95 arranged to provide a snap action or quick break, as well as quick closing, of the contacts, which is desirable since the clock may be and preferably is run on full line voltage. The contact 99 is moved by spaced pins 91 and 92 on a link 90 connected to the thermostrip. In this arrangement the running down of the spring as indicated by the movement of cam wheel 25 initiates the winding action as formerly. When contacts 26c and 27b are closed, the circuit is completed through the heating coil. It is necessary in this case to keep the stated contacts closed during the entire winding period. As the thermostrip bends and moves the winding ratchet link 90 with the pin 91 pulls the contact lever gradually downward until, just about the moment the detent pawl falls off of the tooth upon which it has been resting, the lever is snapped to open circuit position by the action of spring 95 and the heating circuit is broken, while contacts 26c and 27b remain for a brief space in closed position to give a slight overlap and are thereafter opened by continued rotation of the cam wheel. It will therefore be noted that in this series arrangement, as well as in the parallel arrangement, one set of contacts under time control initiate the winding action and the other set under control of the winding mechanism per se control the termination of the winding action.

Fig. 11 shows a modification in which a single circuit contact serves to initiate and discontinue motor activation under mechanical control. The movable contact 130 is insulated and mounted on one arm 131 of a three-armed lever which is pivotally supported at 132. The thermo-strip 34 has a pawl 80 to operate the ratchet wheel 7 as in previous examples, and is also connected by a link 90a to a lever 133 fulcrumed at 134 and arranged to act on arm 135 of the three-armed lever. The latter is held in proper open circuit position by a stop 136 cooperating with its arm 135. The cam wheel 25 driven by a spring (not shown) operatively between it and the winding ratchet wheel 7, is arranged to actuate a lever 137 fulcrumed at 138 and having a spring 139 to retain its end 140 in contact with the cam wheel. The other end of the lever cooperates with arm 141 of the three-armed lever. A spring 142 serves to quickly throw the three-armed lever to open or closed-circuit position after it has been moved past a central point. The relatively fixed contact 143 may be mounted on a spring or other yielding arm 144 so that as the three-armed lever is moving toward open circuit position, contact 143 will follow and keep in engagement with contact 130 until arm 131 of the three-armed lever is ready to snap to open circuit position, thus insuring a quick break, as well as quick closing of the circuit. The heating coil 35 is in series with the contacts. The described mechanism represents broadly any suitable mechanical means for obtaining desired double control of the motor through a single circuit-making and breaking device.

As cam wheel 25 revolves under impulse of the clock spring, one of the cam lobes acts on lever 137 to depress its end 140a against the action of spring 139; at the end of the predetermined winding-cycle time, the high point of the cam lobe passes away from the lever end 140 and spring 139 thereupon quickly snaps the lever 140a upward in contact with arm 141 of the three-armed lever, carrying the latter past central position, and thereafter spring 142 causes or assists in causing the lever to move quickly to closed circuit position with contact 130 engaging contact 143. The heating coil 35 is thereby heated, the strip 34 bends, and the ratchet wheel 7 is turned one tooth space or slightly more. In this movement lever 133 is oscillated and at the end of the winding action moves the three-armed lever to and beyond central position whereupon its spring 142 quickly snaps it to open circuit position. Meantime, the next lobe of cam wheel 25 has retracted lever 137 sufficiently to permit the contact lever to move to the stated position. The cycle is repeated indefinitely, the lever 137 under time control serving to effect the initiation of motor action and lever 133 under control of the winding action serving to terminate the motor action.

Figure 12:
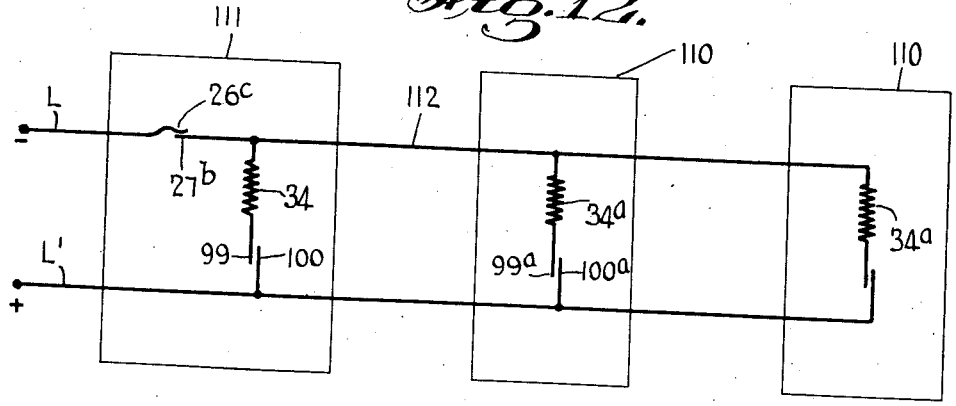
Fig. 12 is a diagram of a primary and secondary clock system.

Fig. 12 diagrammatically shows the present structural and operative features embodied in a primary and secondary clock system. Any suitable number of secondary clocks 110 are controlled by a primary or master clock 111 which may be of any of the forms described, preferably one having a series arrangement of controlling contacts as in Fig. 10. The motor controlled contacts 99 and 100 are in series with positive line L' and the heating coil of thermostrip 34. The time-controlled contacts 26c and 27b are arranged to control connection between negative line L and a branch line conductor 112 which runs to all of the secondaries, which are also supplied by the main positive line L'. Thus in the master clock, the motor-controlled contacts are in series with the thermo-motor and the time controlled contacts; and the time-controlled contacts of the primary control the energizing of the secondary motors through the branch line 112. Each secondary clock 110 includes a motor 34a which may be similar to the thermo-motor 34 and which operates through suitable mechanism the hands of the secondary clock without necessity of course for any spring or other device analogous to a converter (or spring). The motor 34a has controlling contacts 99a, 100a in series with its heating coil, and the coil and contacts are bridged across the main positive line and the branch line 112, the contacts being controlled by the motor in the same fashion as the contacts 99, 100 in Fig. 10. The contacts 26c, 27b of the primary clock are normally open while contacts 99 and 100 and the analogous contacts 99a and 100a of the secondaries are normally closed. If arranged for one minute control as in previous examples, near the end of a minute, contacts 26c, 27b are closed by the time mechanism of the primary clock, thus energizing branch line 112 and all of the motors. The motor of the primary clock acts in the same manner previously described, but the motor controlling contacts 99a and 100a of each secondary clock may be operated or adjusted with regard to the requirements of the particular secondary. These contacts are operated by the motor as in the case of the primary clock, but the motor may have a longer or shorter stroke, or other arrangements may be made in the secondaries to suit each case, it only being necessary that the time contacts in the primary clock shall remain closed for a time equal to the heating period of all of the motors in the system and that the entire cycle of the primary and each secondary clock shall be completed within one minute. The motor actuated control mechanism in the primary and all the secondary clocks at appropriate time in each clock, open the motor circuit, and thereupon the cycle is completed in each secondary clock and the cycle of the primary clock is completed when immediately thereafter the time control mechanism opens the contacts 26c, 27b. The controlling contacts in the secondaries are closed as an incident to the cooling of the motor coils. The stated cycle is repeated indefinitely and the secondaries are accurately and automatically actuated under control of the primary clock.

While I have described the motive mechanism as incorporated in a clock, it will be understood that in the broader aspect of the invention, this is only one practical adaptation, and that many other adaptations may be made.

I claim:

1. Motive mechanism comprising a thermo-dynamic motor, an energy storing device acted on by the motor to store energy and having a driven member, means controlled by said driven member for intermittently initiating motor action, and means controlled by the motor for terminating motor action.

2. Motive mechanism comprising a thermo-dynamic motor, an energy storing device acted on by the motor to store energy and having a driven member, means controlled by said driven member for intermittently initiating motor action, and means controlled by the motor and acting to discontinue motor action after a predetermined time.

3. Motive mechanism comprising an electrically energized thermo-dynamic motor and a circuit controlling motor energization, an energy storing device acted upon by the motor to store energy and having a driven member, means controlled by said driven member for intermittently closing the circuit, and means controlled by the motor for opening the circuit.

4. Motive mechanism comprising a thermo-dynamic motor, a converter including a driving and a driven member, and means controlled by movement of the driven member for intermittently activating the motor, and means controlled by motor action for discontinuing activation of the motor after a predetermined time.

5. Motive mechanism comprising a thermo-dynamic motor, a gear train driven by the motor, means controlled by movement of a member of said gear train for intermittently actuating the motor, and means controlled by motor action for discontinuing such action after a predetermined time.

6. In a clock, a thermo-dynamic motor, an energy storer driven by the motor, a clock train driven by the energy storer, means controlled by movement of a member of the clock train for intermittently actuating the motor, and means controlled by motor action for discontinuing such action after a predetermined time.

7. Motive mechanism comprising an electrically energized thermo-dynamic motor, a circuit therefor, two sets of controlling contacts in the motor circuit, an energy storer driven by the motor, an instrumentality driven by the energy storer, means operated by said instrumentality for operating one of said sets of contacts, and means controlled by motor action for operating the other set of contacts.

8. Motive mechanism comprising an electrically energized thermo-dynamic motor, a circuit therefor, two sets of controlling contacts in series in the motor circuit, an energy storer driven by the motor, an instrumentality driven by the energy storer, means operated by said instrumentality for operating one of said sets of contacts and means controlled by motor action for operating the other set of contacts.

9. Motive mechanism comprising an electrically energized thermo-dynamic motor, a circuit therefor, two controlling contacts in parallel in the motor circuit, an energy storer driven by the motor, an instrumentality driven by the energy storer, means operated by said instrumentality for operating one of said contacts and means controlled by motor action for operating the other contact.

10. Motive mechanism comprising an electrically energized thermo-dynamic motor, a circuit therefor, two sets of controlling contacts in the motor circuit, an energy storer driven by the motor, an instrumentality driven by the energy storer, means operated by said instrumentality for operating one of said sets of contacts, and means controlled by motor action for operating the other, the operating means for the sets of contacts being so associated with the thermo-dynamic motor and with the energy storer respectively that one of said sets of contacts is open when the other set of contacts is closed.

11. A motive system comprising a driving member, a driven member, a thermo-dynamic element connected to operate the driving member, means for heating said element, means controlled by movement of the driven member for supplying heat causing a driving action, and means controlled by a driving action for discontinuing heat-supply.

12. A motive system comprising a driving member, a driven member, a thermo-dynamic element connected to operate the driving member, means for heating said element, means controlled by movement of the driven member for supplying heat causing a driving action, and means acting upon a definite movement of the driving member to discontinue heat-supply whereafter the thermo-dynamic element cools and is repositioned for another driving action.

13. A motive system comprising a driving member, a driven member, an electro-thermo-dynamic motor connected to operate the driving member and including a heater, means controlled by movement of the driven member for supplying current to the heater and causing a driving action, and means controlled by a driving action for discontinuing current supply.

14. A motive system comprising a driving member, a driven member, an electro-thermo-dynamic motor connected to operate the driving member and including a heater, means controlled by movement of the driven member for supplying current to the heater and causing a driving action, and means acting upon a definite movement of the motor to discontinue current supply whereafter the motor is positioned for another driving action.

15. The structure defined in claim 11, with the addition of an energy-storer operatively intermediate the driving and driven members.

16. The structure defined in claim 12, with the addition of an energy-storer operatively intermediate the driving and driven members.

17. The structure defined in claim 13, with the addition of an energy-storer operatively intermediate the driving and driven members.

18. The structure defined in claim 14, with the addition of an energy-storer operatively intermediate the driving and driven members.

19. Motive mechanism comprising an electrically energized thermo-dynamic motor, a circuit therefor, two sets of controlling contacts in the motor circuit, an energy storer driven by the motor, an instrumentality driven by the energy storer, means operated by said instrumentality for operating one of said sets of contacts, and means controlled by motor action for operating the other set of contacts, said latter means operating to close its associated set of contacts before the closing of the first said set of contacts and maintaining said other set of contacts closed until after the first said set of contacts is opened.

20. Motive mechanism comprising a motor including a thermostrip and heating coil, an energy circuit for said coil, an energy storer, means by which the motor drives said energy storer, means driven by the energy storer, sets of controlling contacts in the energizing circuit, means operated by the energy storer for controlling one set of contacts, and means operated by the motor for controlling the other set of contacts.

ROBERT H. HOUGH.